US010433623B2

(12) United States Patent
Trahern

(10) Patent No.: US 10,433,623 B2
(45) Date of Patent: *Oct. 8, 2019

(54) MULTIPLY FUNCTIONING FINGER RING

(71) Applicant: Robert T. Trahern, Sublette, KS (US)

(72) Inventor: Robert T. Trahern, Sublette, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,958

(22) Filed: Dec. 5, 2018

(65) Prior Publication Data

US 2019/0104812 A1  Apr. 11, 2019

Related U.S. Application Data

(63) Continuation-in-part of application No. 15/845,818, filed on Dec. 18, 2017, now Pat. No. 10,182,624.

(51) Int. Cl.
*A44C 9/00* (2006.01)
*A44C 9/02* (2006.01)
(Continued)

(52) U.S. Cl.
CPC .......... *A44C 9/0061* (2013.01); *A44C 9/0015* (2013.01); *A44C 9/02* (2013.01);
(Continued)

(58) Field of Classification Search
CPC ..... A44C 9/0015; A44C 9/003; A44C 9/0061; A44C 9/0053; A44C 9/0084; A44C 9/02; A45C 11/00; A45C 2011/002; A45F 2200/0516; A45F 2200/0525; H04B 1/385; H04B 2001/3861; A41D 13/087
(Continued)

(56) References Cited

U.S. PATENT DOCUMENTS 421,665 A * 2/1890 Buchman ............. B26B 27/007
30/298
805,664 A * 11/1905 Ramage ............... A61F 13/105
2/21
(Continued)

FOREIGN PATENT DOCUMENTS

DE 102014003820 A1 * 9/2015 ............... A44C 9/00
GB 190900804 * 5/1909
(Continued)

*Primary Examiner* — Dean J Kramer
(74) *Attorney, Agent, or Firm* — Kenneth H. Jack; Davis & Jack, L.L.C.

(57) ABSTRACT

An assembly for alternatively ornamenting a proximal end of a finger and enhancing friction at the finger's distal end, the assembly incorporating first and second bands; an adjustable ring clasp for alternatively receiving and releasing the finger; a magnetic crown; a wholly formed joint interconnecting the magnetic crown and the second band, the wholly formed joint positioning the magnetic crown over the second band's upper end; a shaft having an anchor end pivotally attached to the first band, and having an opposite end attached to the second band, the shaft being adapted for, upon mounting of the first band upon the finger, orbiting and counter-orbiting the second band between flexed and extended positions wherein upon flexing the magnetic crown may overlie the proximal end of the finger, and wherein upon extending, the magnetic crown may overlie the finger's distal end.

12 Claims, 6 Drawing Sheets

(51) Int. Cl.
   *A45C 11/00* (2006.01)
   *H04B 1/3827* (2015.01)
(52) U.S. Cl.
   CPC .............. *A45C 11/00* (2013.01); *H04B 1/385* (2013.01); *A44D 2203/00* (2013.01); *A45C 2011/002* (2013.01); *A45F 2200/0516* (2013.01); *H04B 2001/3861* (2013.01)
(58) Field of Classification Search
   USPC .......................................................... 294/25
   See application file for complete search history.

(56) References Cited

U.S. PATENT DOCUMENTS

| | | | | |
|---|---|---|---|---|
| 922,954 A * | 5/1909 | Rives | ................... | A41D 13/087 2/21 |
| 931,511 A * | 8/1909 | Southworth | .......... | B26B 27/007 2/21 |
| 1,174,887 A * | 3/1916 | Meriwether | .......... | A61F 13/105 131/186 |
| 1,268,103 A * | 6/1918 | Flemming | ............ | A41D 13/087 2/21 |
| 2,735,321 A * | 2/1956 | Browne | .................. | B25B 13/06 294/25 |
| 3,596,964 A * | 8/1971 | Zazzara | ............... | B43K 23/012 224/217 |
| 4,507,804 A * | 4/1985 | Consigny | ............. | A41D 13/087 2/163 |
| 5,070,563 A * | 12/1991 | Tervola | ................ | A44C 5/0046 294/25 |
| 5,186,189 A * | 2/1993 | Harris | .................... | A45D 29/00 132/285 |
| 5,220,690 A * | 6/1993 | Hoos | .................... | A41D 13/087 2/160 |
| 5,885,018 A * | 3/1999 | Sato | ..................... | B43K 23/012 401/7 |
| 7,614,252 B2 * | 11/2009 | De Lyrot | ............. | A44C 9/0015 63/15.1 |
| D653,580 S * | 2/2012 | Hustik | ........................... | D11/26 |
| 8,262,599 B2 * | 9/2012 | Chandrasekar | ........... | A61F 5/10 602/20 |
| D676,777 S * | 2/2013 | Williams | ....................... | D11/26 |
| 8,584,298 B2 * | 11/2013 | Viscomi | ............... | A61C 19/002 15/104.92 |
| 8,672,374 B1 * | 3/2014 | Webber | ................ | F16M 11/041 224/217 |
| 8,887,970 B2 * | 11/2014 | Tsai | ...................... | G06F 1/1626 224/217 |
| 9,496,909 B2 * | 11/2016 | West | ...................... | H04B 1/385 |
| 9,723,910 B2 * | 8/2017 | Due | .......................... | A45F 5/10 |
| 10,182,624 B2 * | 1/2019 | Trahern | ............... | A41D 13/087 |
| 2009/0270050 A1 * | 10/2009 | Brown | ...................... | A45F 5/00 455/90.3 |
| 2013/0146625 A1 * | 6/2013 | Karle | ........................ | A45F 5/00 224/217 |
| 2015/0000686 A1 * | 1/2015 | Bajaj | ...................... | A45D 40/00 132/200 |
| 2015/0122852 A1 * | 5/2015 | Feng | ........................ | A45F 5/00 224/191 |
| 2015/0342328 A1 * | 12/2015 | Seger | ...................... | A45F 5/004 224/162 |
| 2016/0045019 A1 * | 2/2016 | Srey | ......................... | A45F 5/10 294/65.5 |

FOREIGN PATENT DOCUMENTS

| | | | |
|---|---|---|---|
| JP | 2010207332 | * | 9/2010 |
| WO | WO 9910133 | * | 3/1999 |
| WO | WO 2015055870 | * | 4/2015 |
| WO | WO 2017081071 | * | 5/2017 |

\* cited by examiner

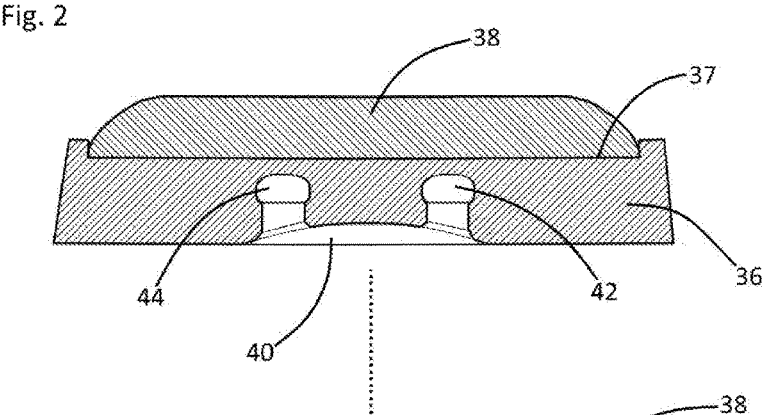
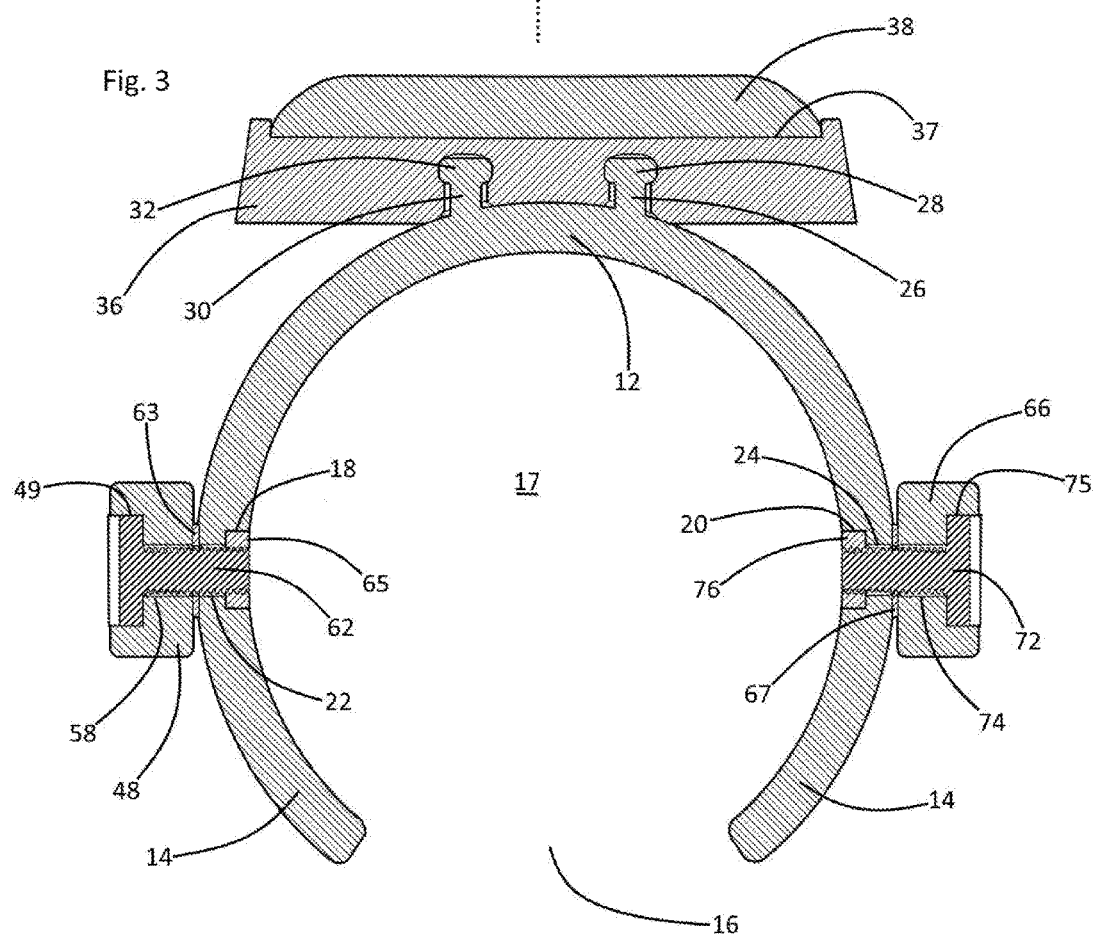

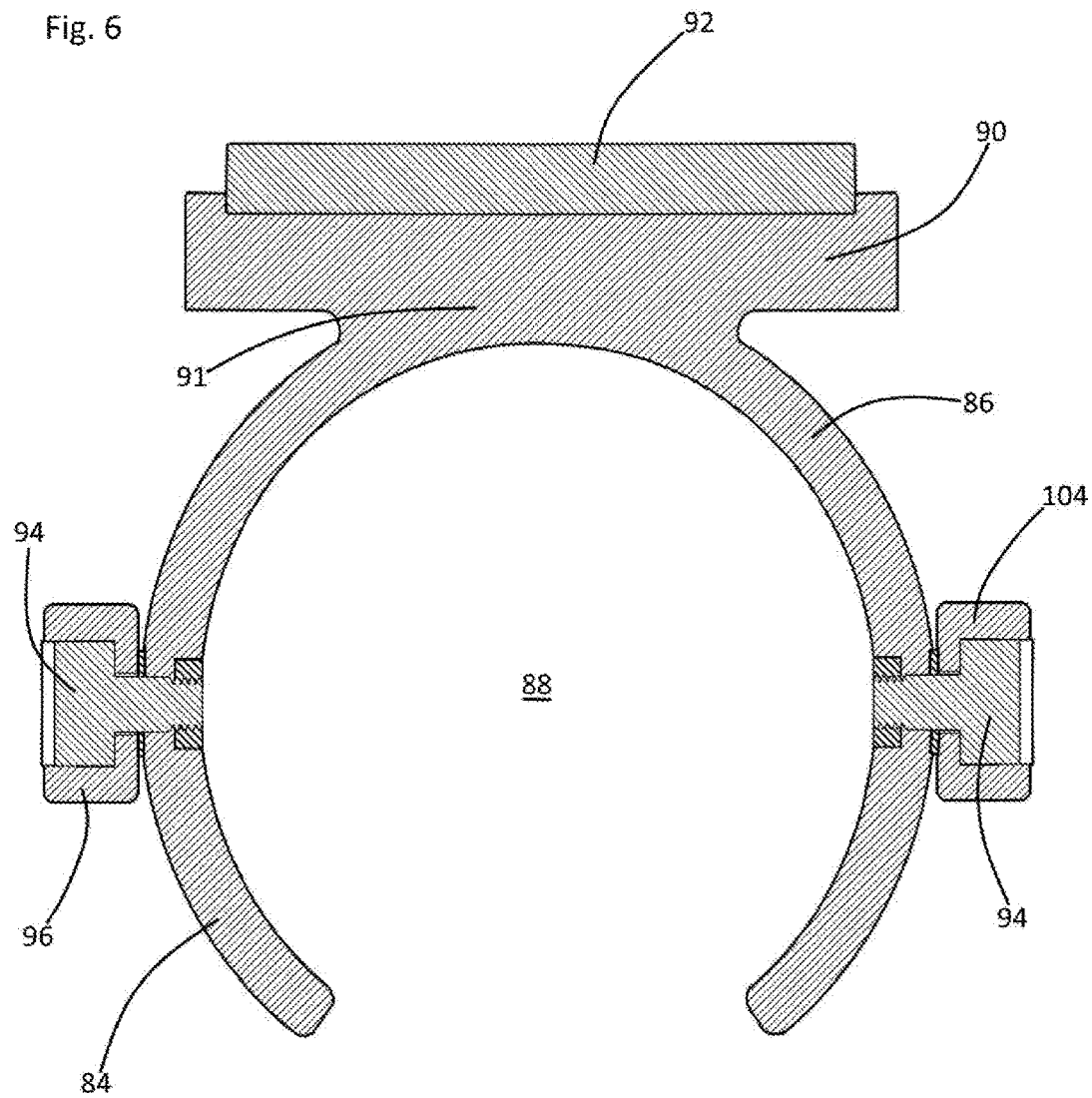

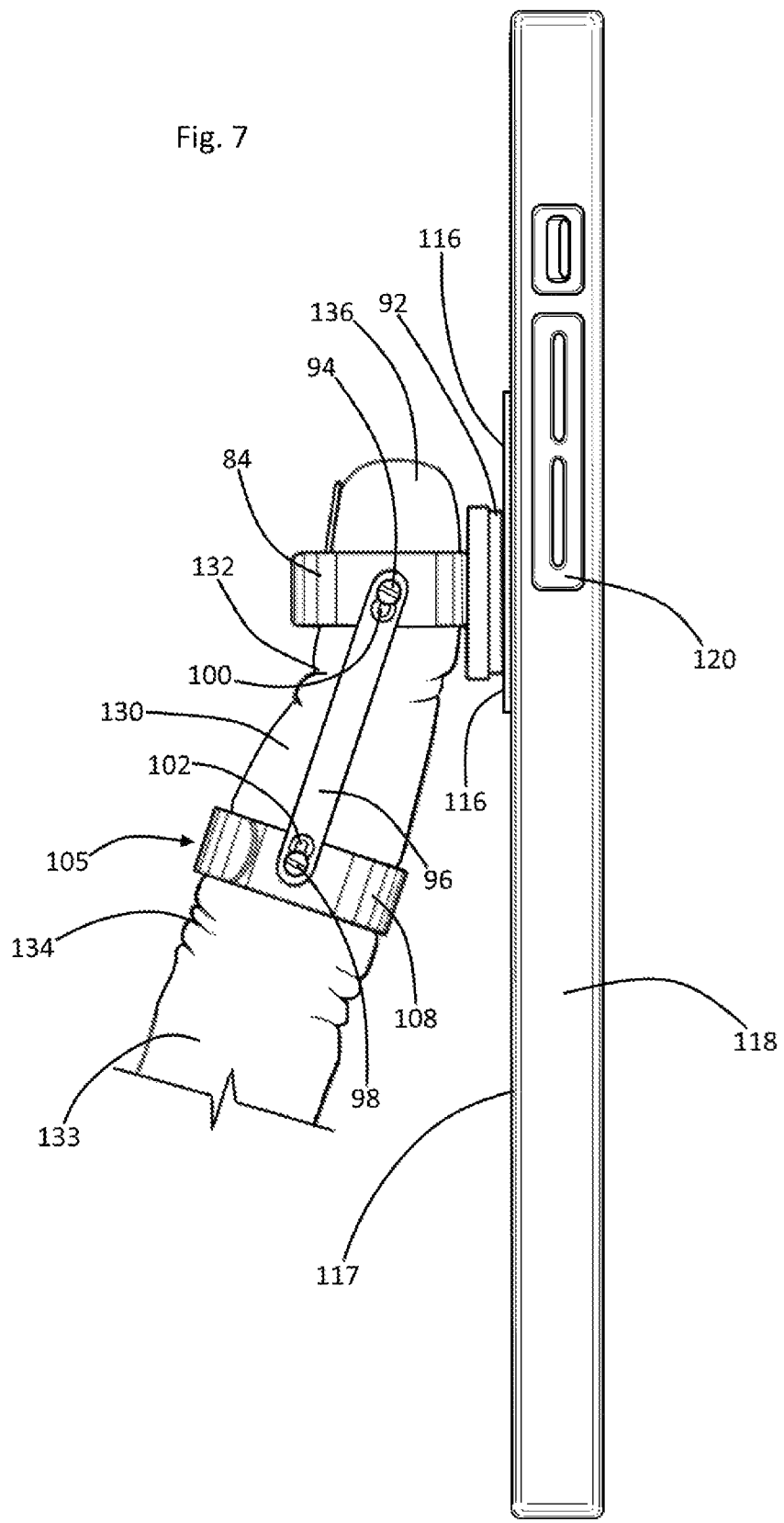

MULTIPLY FUNCTIONING FINGER RING

Reference is made to U.S. patent application Ser. No. 15/845,818, entitled "Multiply Functioning Finger Ring" and filed Dec. 18, 2017. The specification and drawings of said '818 application are hereby incorporated by reference. The instant application constitutes a Continuation-in-Part of said '818 application. The inventor of and applicant of said '818 application and the instant application are the same, and the instant application is filed prior to any issuance or abandonment of said '818 application. The benefit of and priority from said '818 application's Dec. 18, 2017, filing date is hereby claimed.

To assist in understanding differences between the specification of said '818 application and that of the instant application, the instant application is submitted both in a line-in/line-out format and in a clean format.

FIELD OF THE INVENTION

This invention relates to finger rings. More particularly, this invention relates to such rings which are adapted for additionally functioning for enhancing the finger's ability to grasp and manipulate objects.

BACKGROUND OF THE INVENTION

Conventional finger rings are known to perform a function of ornamenting a dorsal aspect or back-of-hand side of a wearer's finger or phalange. Such conventional finger rings typically are mechanically incapable of performing any other or additional function in relation to the function of the finger on which the ring is worn. The instant inventive multiply functioning finger ring incorporates additional and unique structures into a finger ring causing the ring to constitute a mechanical assembly which may additionally and alternatively function as a fingertip friction enhancing device.

BRIEF SUMMARY OF THE INVENTION

The instant inventive multiply functioning finger ring preferably comprises an assembly of structural components which is specially adapted for alternatively performing a conventional ornamenting function at a dorsal aspect of a proximal end of a ring wearer's finger or phalange, and for enhancing fingertip friction at the palmar aspect of the finger's distal end. In a preferred embodiment, the inventive assembly comprises first and second bands which respectively have upper and lower shanks or upper and lower ends.

Further structural components of the instant inventive assembly comprise first means for alternatively receiving and releasing the finger upon which the assembly is worn. Such receiving and releasing means are preferably connected operatively to or are formed wholly with or integrally as a part of the assembly's second band component. In a preferred embodiment, such first means comprise a void or open space positioned at the lower end of the second band, such void allowing lateral and oppositely lateral arcs of such band to splay away from each other for finger insertions.

A further structural component of the instant inventive assembly comprises a crown which is preferably decorative and has a friction enhancing upper surface. In a preferred embodiment, such friction enhancing upper surface comprises a pad or layer of a high friction elastomeric material such as synthetic rubber. Suitably, frictional contact at the crown's upper surface may be enhanced by incorporating within the substrate of such surface a permanent magnet. The crown is preferably fixedly attached to or formed wholly with the upper end of the second band.

A further structural component of the instant inventive assembly comprises at least a lateral shaft, and preferably both such lateral shaft and an oppositely lateral shaft. In the preferred embodiment, radially inner ends or anchor ends of such shafts are pivotally attached to laterally opposed sides of the first band. The opposite ends of such shafts (i.e., the shafts' orbiting ends) are necessarily attached to the second band, and those attachments are preferably pivoting joints which are positioned at laterally opposed sides of the second band. In the preferred embodiment, such shafts are adapted for, upon an annular positioning of the first band about the middle portion of the wearer's finger, guiding orbiting and counter-orbiting movements of the second band between a flexed position and an extended position.

Upon pivoting and orbital movements of the shafts and the attached second band toward their flexed positions, the open void of the second band may receive the proximal end of the finger, allowing the second band to securely grasp the finger. Such orbiting positioning of the second band allows the decorative crown component to overlie the dorsal aspect of the finger. Accordingly, upon a pivoting execution of such orbiting and flexing motion, the instant inventive assembly may advantageously perform a function of finger ring ornamenting.

Upon opposite or counter-orbiting pivoting of the shafts and second band to their extended positions, the second band distally pivots with respect to the distal extension of the finger. During such pivoting, the second band may swivel upon its preferably provided pivot mounts to allow the second band to receive the finger at its tip or distal end. Such pivoting advantageously causes the high friction crown and/or magnetic crown to invert and to underlie the fingertip. Such counter-orbiting pivotal positioning of the assembly allows the preferred high friction or magnetic character of the crown to provide a relatively high friction surface (relative to skin friction) for fingertip contacts. Accordingly, the instant inventive assembly allows a relatively low friction object such as a cell phone to be securely held and manipulated in a slip free fashion. To assist in magnetic holding of such cell phone, the instant inventive assembly may incorporate a paramagnetic steel plate which is adhesively attached to or mechanically positioned at the cell phone's back side.

Accordingly, objects of the instant invention include the provision of a multiply functioning finger ring which incorporates structures as described above, and which arranges those structures in relation to each other in the manners described above for the performance of the beneficial functions described above.

Other and further objects, benefits, and advantages of the instant invention will become known to those skilled in the art upon review of the Detailed Description which follows, and upon review of the appended drawings.

BRIEF DESCRIPTION OF THE DRAWINGS

FIG. 2 is a sectional view of a crown component in accordance with FIG. 1.

FIG. 3 is an alternative sectional view in accordance with FIG. 1.

FIG. 6 is a sectional view as indicated in FIG. 5.

FIG. 7 redepicts the structure of FIG. 5 shown in side view, and additionally showing the assembly worn upon a finger and magnetically holding a cell phone.

DETAILED DESCRIPTION OF A PREFERRED EMBODIMENT

Figure 1:
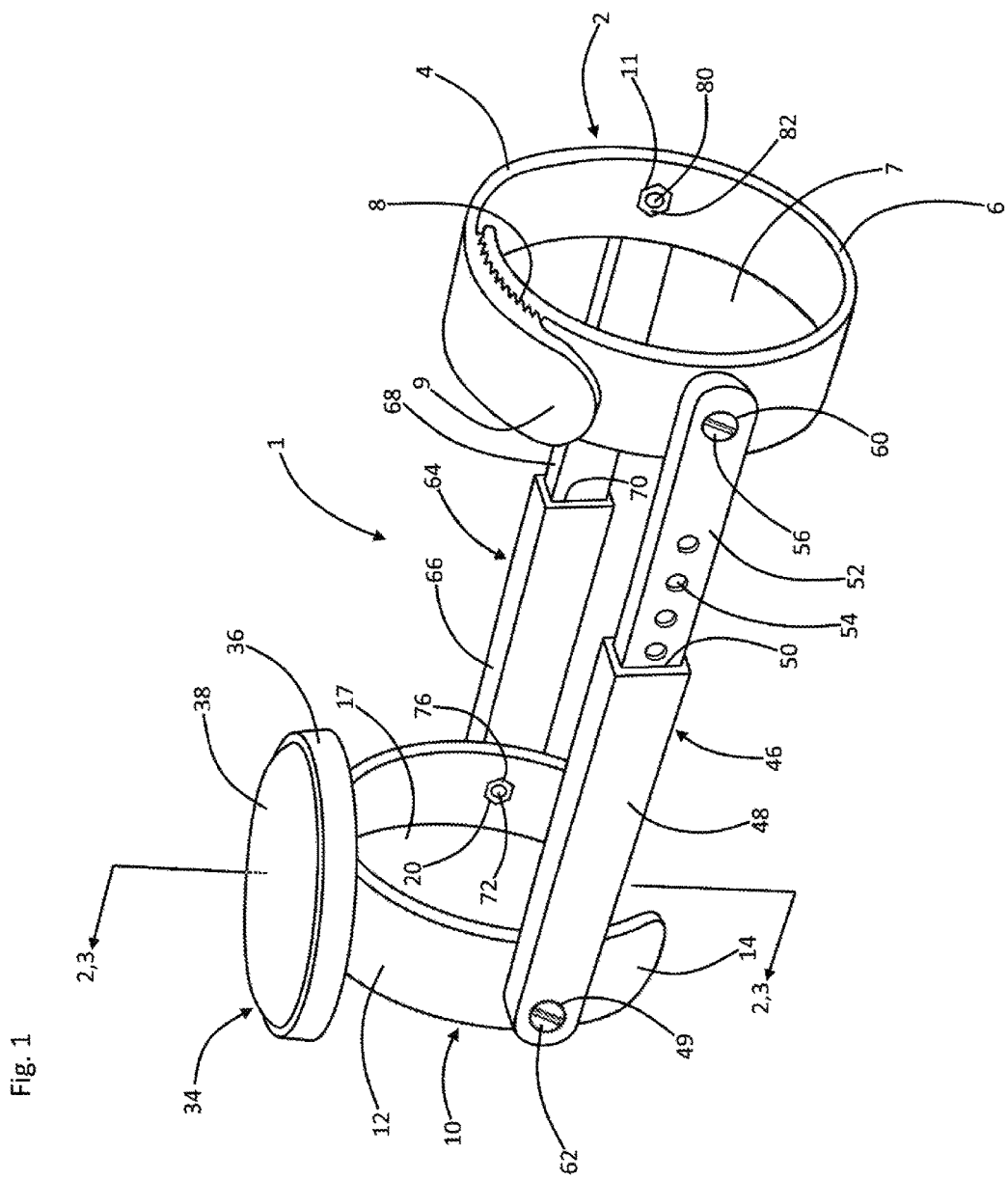
FIG. 1 is a perspective view of a preferred embodiment of the instant inventive multiply functioning finger ring.
Figure 4:
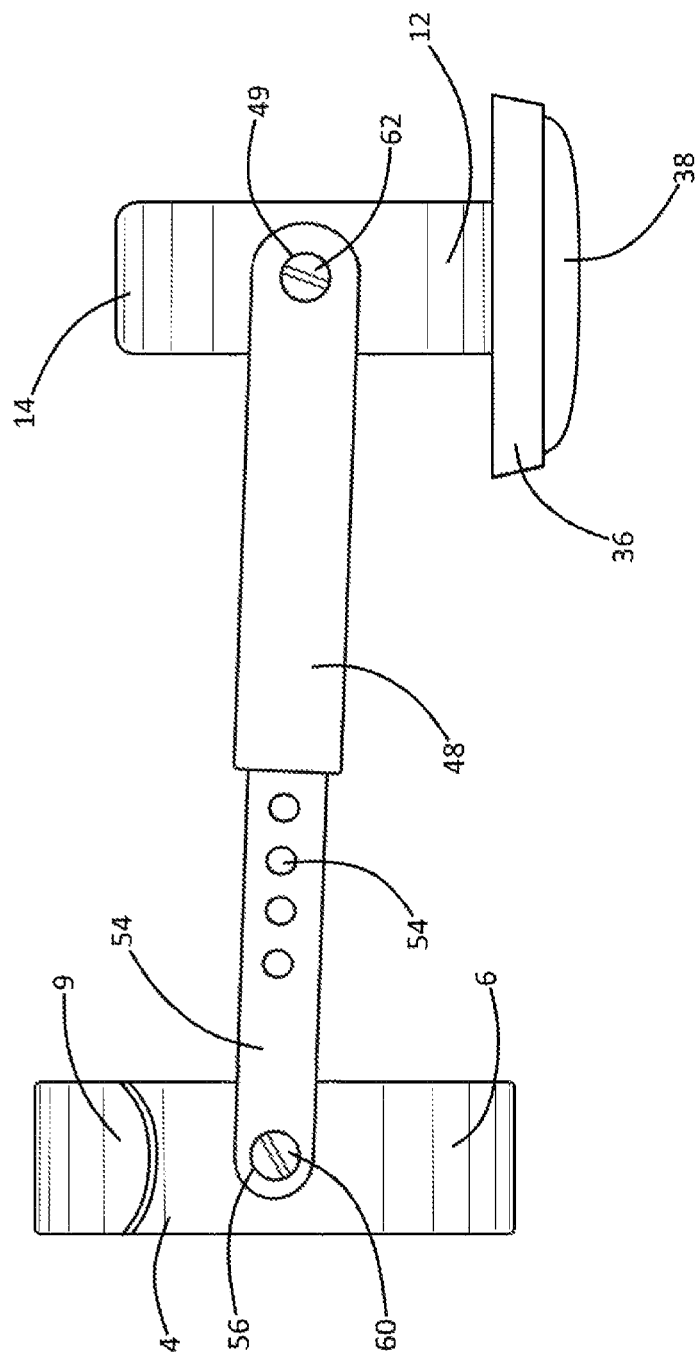
FIG. 4 is a side plan view of the structure of FIG. 1, the view showing a reconfiguration of components.

Referring now to the drawings and in particular to Drawing FIG. 1, a preferred embodiment of the instant inventive multiply functioning finger ring is referred to generally by Reference Arrow 1. Referring further simultaneously to FIG. 4, a first structural component of the assembly 1 comprises a first band which is referred to generally by Reference Arrow 2, such band having an upper portion or upper shank 4 and having a lower portion or lower shank 6. Suitably, the first band 2 may comprise a continuous annular loop or ring. However, as depicted, the first band preferably incorporates series of interlocking teeth 8 which may clamp the lateral and oppositely lateral extensions of the upper shank 4 at a multiplicity of manually selectable finger circumference fitting sizes. Upward pulling upon tab 9 effectively releases the teeth 8 for adjustment and readjustment of the effective circumference of band 2. In a preferred embodiment, the first band 2 has an oppositely lateral inner surface recess 11 which receives and securely holds helically threaded hex nut 82, and similarly has a lateral nut receiving recess (not within views). Such recesses 11 and nuts 82 comprise swivel joint components whose functions are further explained below.

Referring simultaneously to FIGS. 1-4, a further structural component of the instant inventive assembly comprises a second band which is referred to generally by Reference Arrow 10, such band 10 having an upper shank portion 12, and a lower shank portion 14. In a preferred embodiment, the lower shank portion 14 of the second band 10 includes a lower opening or void 16 which allows lateral and oppositely lateral sides of the band 10 to be splayed for widening of opening 16 to facilitate an upward receipt of a phalange or finger into space 17. The opening or void 16 constitutes a first finger receiving and releasing means component of the instant inventive assembly, such means component being formed integrally with band 10. Alternatively, such means component may suitably be configured similarly with the first band's interlocking teeth adjustable fastener 8, such fastener type being representative of the invention's second means for finger receipt and release.

Lateral and oppositely lateral sides of the second band 10 preferably include swivel screw receiving apertures 22 and 24, such apertures enlarging at their inner ends to form fitted hex nut receiving recesses 18 and 20. Lateral and oppositely lateral snap fastener posts 30 and 26 having enlarged heads 32 and 28 (the functions of which are explained below) preferably extend upwardly from the upper end or upper shank 12 of band 10.

A crown component of the instant inventive assembly is referred to generally by Reference Arrow 34. In a preferred embodiment, the crown 34 comprises a disk shaped (or other geometric configuration) base 36 having an upwardly opening pad receiving recess 37. A high friction elastomeric pad or layer 38 is nestingly received within recess 37, and such pad is preferably adhesively bonded in place. Referring further to the alternately configured assembly of FIG. 5, pad 38 may alternatively comprise a permanent magnet 92. The upper end or shank 12 of band 10 preferably is upwardly receivable within recess 40, and lateral and oppositely lateral snap sockets 44 and 42 which open within recess 40 may simultaneously receive snap posts 30, 32, 26, and 28. Movement of the crown 34 which is manually driven downwardly from the overlying FIG. 2 position toward the FIG. 3 position may effectively and securely releasably snap the crown 34 in place upon band 10 as indicated in FIG. 3. The snap fastener components 26,28,30,32,40,42,44, are considered as being representative of other suitably substituted connectors and fasteners which are capable of securely and releasably interconnecting the crown 34 upon the band 10. Suitably, the crown 34 may be alternatively rigidly wholly formed with the second band 10 (e.g. in the manner of the wholly formed joint 91 indicated in Drawing FIG. 6), or may be permanently adhesively bonded to band 10. Such rigid alternative attachments and the releasable snap fasteners depicted in FIGS. 2 and 3 are considered to be alternative representations of the instant invention's attaching means component.

A lateral shaft component of the instant inventive assembly is referred to generally by Reference Arrow 46, such shaft 46 suitably comprising a telescoping or alternatively extending and retracting element. In such suitable embodiment, the lateral shaft 46 is configured as a quill 48 and stem 52 combination wherein the quill 48 has a hollow bore 50, and wherein the stem 52 is closely fitted for nesting and sliding receipt within quill 48. In such suitable embodiment, the quill component 48 includes an interior lug or detent element (not depicted within views) which extends inwardly from an inner wall of quill 48. Such lug or detent may selectively engage recess series 54 for adjusting the overall length of the lateral shaft 46.

A swivel screw 56 suitably extends oppositely laterally through the pivoting anchor end of shaft 46, and the head of such screw 56 unobtrusively nests within recess 60. At the opposite or orbiting end of shaft 46, a swivel screw 62 similarly extends oppositely laterally, the head of such screw 62 being similarly unobtrusively nested within recess 49. From such recess 49, the swivel screw 62 further extends oppositely laterally through an aperture 58 within the orbiting end of quill 48.

In the FIG. 1 embodiment, an oppositely lateral shaft, referred to generally by Reference Arrow 64, is additionally provided for the purpose of enhancing the lateral stability of the assembly 1. The oppositely lateral shaft 64 similarly includes a quill 66 having a hollow bore 70, such bore being closely fitted for slidably receiving a telescoping stem 68. A swivel screw 80 extends laterally through the anchor end of shaft 64, and such screw 80 is preferably threadedly received within the hex nut 82 which is unobtrusively nestingly received within and held against rotation by the recess 11. Swivel screw 72 at the opposite orbiting end of shaft 64 similarly oppositely laterally extends through recess 75 and through aperture 74, the inner end of such screw 72 being threadedly received by a nut 76 which is received within recess 20.

Lateral and oppositely lateral washers 63 and 67 suitably provide rotary bearing surfaces for swiveling motions of the second band 10 with respect to the orbiting ends of shafts 46 and 64. Similar washers (not depicted within views) are suitably provided for facilitating rotary motions of the first band 2 with respect to the anchor ends of shafts 46 and 64.

Figure 5:
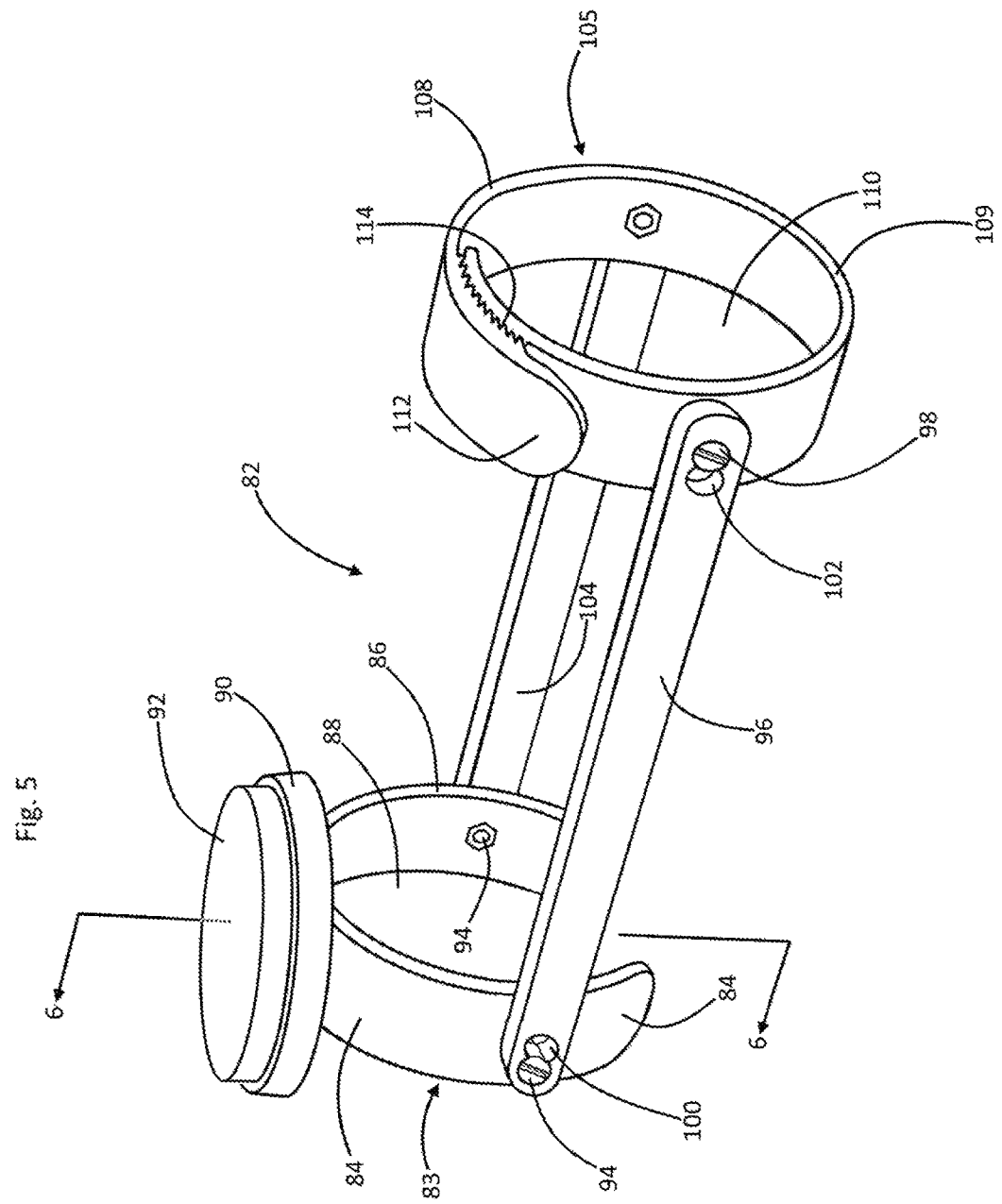
FIG. 5 is a perspective view of an alternative embodiment of the instant inventive multiply functioning finger ring.

In the alternate configuration 82 of FIGS. 5 and 6, band 105 with upper and lower extensions 108 and 109, finger space 110, teeth 114 and tab 112 functionally correspond with components 4,6,7,8, and 9 of the FIG. 1 structure. Band 83,84,86,88 and crown 90,92 similarly correspond with components 12,14,17,36 and 38 of the FIG. 1 structure. As an alternative to the telescoping shafts 46 and 68 of the FIG. 1 structure, the FIG. 5 alternative provides rigid shafts 96 and 104 which present extension and retraction eyes 100 and 102 which receive swivel pins 94 and 98. The eyes 100 and 102 constitute series of screw head positioning voids which provide for adjustments of the effective lengths of shafts 96 and 104.

In use of the instant inventive assembly 1, a wearer of the FIG. 1 assembly may initially grasp band 2 and may utilize a fingernail to upwardly pull upon tab 9 in order to disengage teeth 8. Thereafter, the wearer may extend one of his or her fingers (the middle finger of the left hand for example) forwardly or distally into the central space 7 of the first band 2.

Thereafter, the wearer may squeeze the lateral and oppositely lateral sides of the first band 2 toward each other causing teeth 8 to engage each other and to progressively reduce the effective circumference of the first band 2. The progressive engagement of teeth 8 preferably continues until the interior circumference of the band 2 closely matches the circumference of the wearer's middle finger. Similarly, as shown in the alternative FIG. 7 assembly, band 105 engages finger 133.

In the preferred embodiment, such middle finger (e.g., 133) mounting of the first band 2 positions such band 2 so that it annularly extends about the finger's middle phalangeal portion (e.g., portion 130) between the finger's proximal and distal inter-phalangeal joints (e.g., joints 134 and 132). Upon such mounting and positioning, slight diameter enlargements which are commonly present at the finger's proximal and distal inter-phalangeal joints may advantageously serve as slide stops for preventing the first band 2 or alternative band 105 from excessively sliding distally or proximally along the finger during use of the inventive assembly.

Thereafter, the user may simultaneously pivot or orbitally move the lateral and oppositely lateral shaft components 46 and 64 in the counter-clockwise direction (or in the proximal direction) about the shaft anchoring swivel screws 60 and 80, such orbiting motions constituting a flexing motion with respect to the finger. Upon such motion, the second band 10 orbits toward the proximal end of the user's finger, and upon completion of such motion, the dorsal aspect of the user's finger enters and passes through the void or opening 16, allowing the finger to securely reside within ring space 17.

In a preferred mode of utilization of the instant inventive assembly 1, the wearer may, immediately prior to inducing the above described orbiting motions of shafts 46 and 48, telescopingly adjust the effective lengths of such shafts, utilizing detents 54 of the FIG. 1 configuration, or, alternatively, using length adjustment eyes 100,102 of the FIG. 5 configuration. In a preferred usage mode, such telescoping manipulating of shafts adjusts their lengths so that they hold the second band 10 at a location at which they may encircle the finger's proximal phalanx portion between the fingers' metacarpophalangeal and proximal interphalangeal joints. Slight finger diameter enlargements which are commonly present at such metacarpophalangeal and proximal interphalangeal joints may advantageously resist proximal and distal sliding motions of the second band 10 along the finger. Upon completion of such orbital positioning of shafts 46 and 64, and of band 10, the crown 34 overlies the dorsal aspect of the proximal end of the finger. Such positioning advantageously allows the crown 34 to perform a conventional finger ornamenting function.

In the event that the wearer wishes to grasp a smooth or slippery object such as a cell phone (e.g., cell phone 120 of FIG. 7, such cell phone 120 being representative of handheld digital devices), the wearer may grasp the second band 10 and may pull upwardly thereon, causing the finger to exit space 17 through opening 16, and disengaging the band from the proximal end of the wearer's finger. Upon such disengagement, the band 10, the crown 36, and the shafts 46 and 64 freely counter-orbit about lateral and oppositely lateral swivel screws 60 and 80. Such counter-orbiting motions constitute extension motions with respect to the finger. The counter-orbiting extension of the assembly preferably continues until the band 10 and crown 34 reside at the distal phalanges portion of the finger. Similarly with the above described telescoping adjustments of shafts 46 and 64 for proximal phalangeal positioning of the second band 10, such shafts may be preliminarily telescopingly adjusted so that crown 34 and its frictional pad 38 overlie in the palmar direction the user's fingertip.

Referring in particular to FIG. 3, upon such telescoping readjustment and upon such counter-orbiting positioning of the second band 10, downwardly directed fingertip pressure applied to the inner periphery of such band may effectively press the high friction elastomeric pad 38 against a relatively slippery surface such as the cell phone's screen or the cell phone's case 118. During such frictional contact, annular holding forces applied by bands 2 and 10 to the finger, combined with the functions of shafts 46 and 64 as ties therebetween, allows the cell phone to be securely held at the wearer's fingertips.

To further enhance frictional holding, and assuming incorporation of the magnet 92 of the FIGS. 5-7 configuration, a paramagnetic steel plate 116 may be adhesively bonded with the back surface 117 of the cell phone case 118. Alternatively, such plate 116 may be directly bonded to the back of the cell phone 120, or may be nestingly held between the back of the case 118 and the back of the cell phone 120. Magnetic attraction between the permanent magnet 92 and plate 116 enhances frictional holding at the point of contact between those structures. In a suitable alternative configuration, plate 116 may constitute a permanent magnet and crown component 92 is may constitute either paramagnetic material or may constitute an opposite polarity permanent magnet.

A reversal of the assembly manipulating steps described above re-configures the assembly for conventional ring finger ornamenting use as indicated in FIG. 1.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An assembly for alternatively ornamenting at a dorsal aspect of a proximal end of a finger and enhancing friction at a palmar aspect of the finger's distal end, said assembly comprising:
 (a) first and second bands having upper and lower ends;
 (b) first means for alternatively receiving and releasing the finger, said first means being formed wholly with or connected operatively to the second band;
 (c) a magnetic crown;

(d) attaching means interconnecting the magnetic crown and the second band, the attaching means positioning the crown over said band's upper end; and (e) a lateral shaft having an anchor end pivotally attached to the first band and having an opposite end attached to the second band, the lateral shaft being adapted for, upon mounting of the first band upon the finger, orbiting and counter-orbiting the second band between flexed and extended positions wherein, upon the orbiting to the flexed position, the magnetic crown overlies the dorsal aspect of a proximal end of the finger, and upon the counter-orbiting to the extended position, the magnetic crown overlies a palmar aspect of the finger's distal end.

2. The assembly of claim 1 wherein the attachment of the opposite end of the lateral shaft to the second band is adapted for facilitating pivoting of the second band.

3. The assembly of claim 2 further comprising an oppositely lateral shaft spanning between the first and second bands, the oppositely lateral shaft being positioned oppositely laterally from the lateral shaft.

4. The assembly of claim 3 wherein the lateral and oppositely lateral shafts are adapted for length adjusting motions.

5. The assembly of claim 4 wherein the first means for alternatively receiving and releasing the finger comprise a void within the second band's lower end.

6. The assembly of claim 5 further comprising second means for alternatively receiving and releasing the finger, the second means for alternatively receiving and releasing the finger being formed wholly with or connected operatively to the first band.

7. The assembly of claim 6 wherein the second means for alternatively receiving and releasing the finger comprise an interlocking teeth fastener.

8. The assembly of claim 7 wherein the magnetic crown has a frictional upper surface.

9. The assembly of claim 4 wherein the adaptations of the lateral and oppositely lateral shafts for length adjusting comprises series of screw head receiving eyes.

10. The assembly of claim 1 wherein the attaching means comprise a wholly formed joint.

11. The assembly of claim 1 further comprising a paramagnetic plate attached to a handheld digital device, the magnetic crown connecting with said plate.

12. The assembly of claim 11 further comprising a case receiving a cell phone, the paramagnetic plate's attachment being positioned upon the case.

* * * * *